Jan. 21, 1958 R. E. SAUZEDDE 2,820,537
SPRAG CLUTCH
Filed Feb. 18, 1954
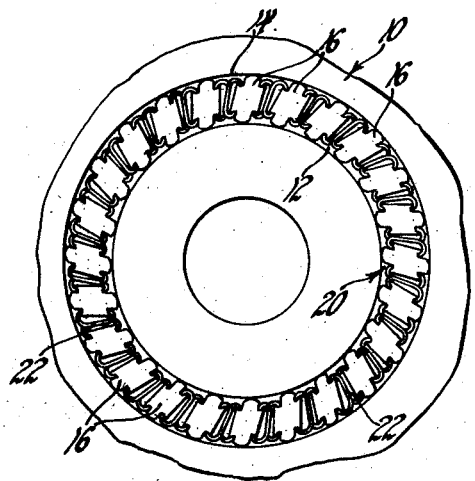
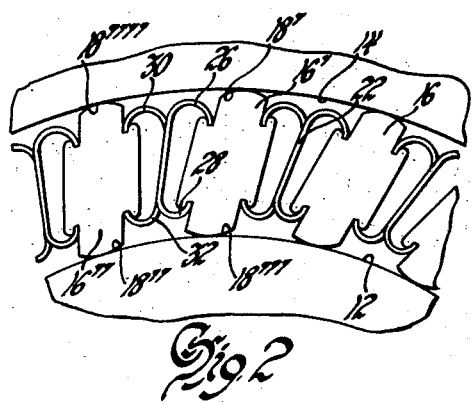
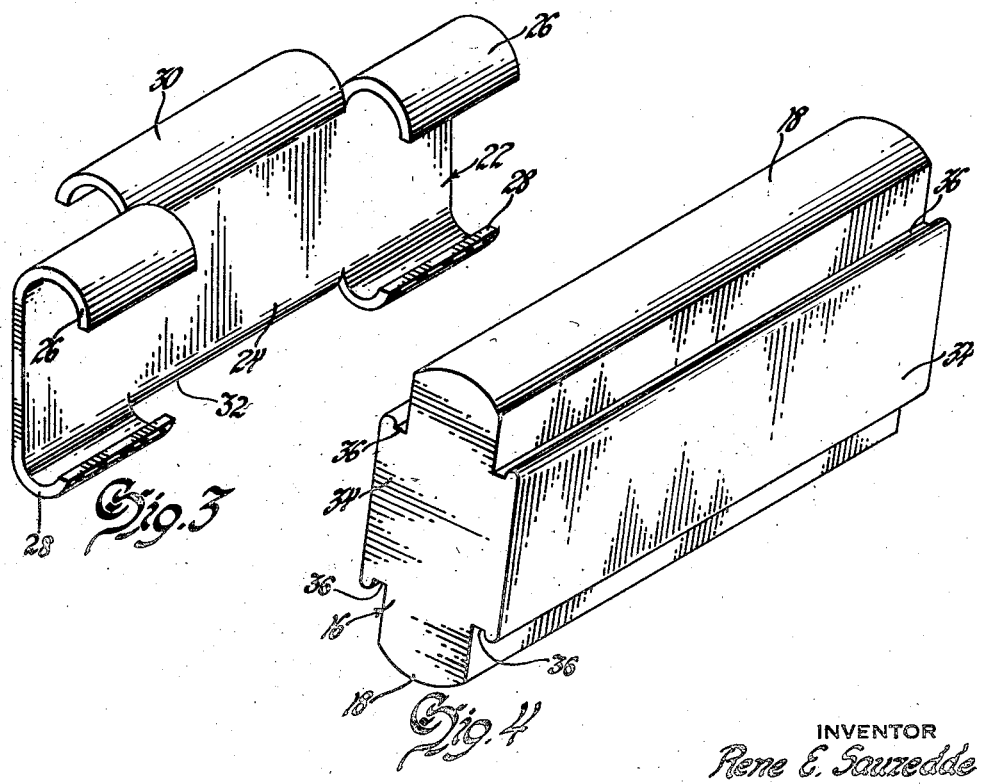
INVENTOR
Rene E. Sauzedde
BY Edward H. Goodrich,
ATTORNEY United States Patent Office 2,820,537
Patented Jan. 21, 1958

2,820,537

SPRAG CLUTCH

René E. Sauzedde, Terryville, Conn., assignor to General Motors Corporation, Detroit, Mich., a corporation of Delaware Application February 18, 1954, Serial No. 412,758

12 Claims. (Cl. 192—45.1)

The present invention relates to sprag clutches and more particularly to spring means for positioning the sprags for movement into and out of wedging engagement with a pair of relatively rotatable concentric races.

In the operation of one way clutches employing a plurality of identical sprags or tiltable grippers that are positioned to wedge between a pair of substantially concentric races, it is desirable to provide means for insuring that the opposite ends of all of the sprags engage the races at all times and that all of the sprags will simultaneously move into or out of wedging engagement with the races whenever the relative directions of the races are reversed. This assists in insuring that all of the sprags are wedged between the races so that each of the individual sprags carry their proportional share of the load. Due to manufacturing tolerances there are considerable differences in the lengths and shapes of the sprags that result in considerable variations in the positioning of the sprags between the races. Heretofore, whenever a means such as a cage was provided for positioning the sprags and forming a unit handling assembly, interference between the sprags and cage means and/or misalignment of the sprags frequently occurred. Although flexible spring means have been provided for forming a unit handling sprag clutch, the resultant clutch is too flexible to be easily handled and serviced.

It is now proposed to provide retaining means for individually biasing each sprag so that the opposite ends thereof will engage the races at all times. The retaining means may include individual springs secured to the sprags to connect them together and form an annulus of sprags for use between a pair of concentric races. When the sprags are disposed between the races, the springs will resiliently force the ends of the sprags against the races.

It is also proposed to provide spring means that are adapted to be secured to the spags in a one way clutch and form a semi-rigid assembly. The assembly will be a unit handling assembly which will retain a substantially cylindrical shape regardless of whether or not it is disposed between the pair of races.

In the one sheet of drawings:

Fig. 1 is a side view of a sprag clutch employing the present invention.

Fig. 2 is an enlarged view of a portion of the clutch in Fig. 1.

Fig. 3 is a perspective view of a spring clip for securing the sprags together.

Fig. 4 is a perspective view of a sprag suitable for use in the present invention.

Referring to the drawings in more detail, the present invention may be embodied in any suitable one way clutch 10 adapted to be disposed between a substantially cylindrical inner race 12 and a substantially cylindrical outer race 14 disposed in spaced concentric relation therewith. In the present instance the clutch 10 is of the so-called "sprag" type wherein a plurality of substantially identical tiltable grippers or sprags 16 are adapted to be disposed in circumferentially spaced relation between the inner and outer races 12 and 14. Each of the sprags 16 are disposed in a nearly radial position about the axis of rotation. The inner and outer ends of the sprags may be provided with cam surfaces 18 that are positioned to engage the races 12 and 14. The cam surfaces 18 are disposed so that one diagonal of the sprags 16 is not only longer than the other diagonal but also longer than the radial distance between the two races 12 and 14. The cam surfaces 18 are adapted to be held in engagement with the races 12 and 14 so that when the outer race 14 rotates clockwise in a non-driving direction relative to the inner race 12, the cam surfaces 18 will merely slide on the races 12 and 14 but when the outer race 14 rotates counterclockwise and in a driving direction relative to the inner race 12, the sprags 16 will tilt so that the longer diagonal is more nearly radial and the sprags 16 are wedged between the inner and outer races 12 and 14. Thus when the outer race 14 rotates clockwise relative to the inner race 12, it will overrun the inner race 12, but when it rotates counterclockwise relative thereto, the sprags 16 will be in a wedged position and transmit torque from one race to the other.

Means may be provided for retaining the sprags 16 properly positioned between the races 12 and 14. In the present instance these means include springs 20. The springs 20 are a plurality of substantially identical individual spring clips 22 which are disposed between and interconnect adjacent pairs of sprags 16. Each spring clip 22 may have a substantially flat body portion 24 disposed radially between the races 12 and 14. The top and bottom of the spring clips 22 may be provided with resilient fingers that are adapted to project circumferentially from said body portion 24. In the present instance, the opposite ends of each spring clip 22 are each provided with a pair of correspondingly curved resilient fingers 26 and 28 looped towards each other from the top and bottom of the body portion 24 at one side of this body portion. The middle portion of each spring clip 22 has resilient fingers 30 and 32 bent from the top and bottom of the body portion 24 and towards each other at the other side of the body portion from that of the fingers 26 and 28. Although the dimensions of the fingers 26, 28 and 30, 32 may be of any proportions, it has been found that if the intermediate fingers 30 and 32 are twice as long axially as the end fingers 26 and 28, the fingers on each side of the body portion will have substantially the same strength.

The fingers 26 and 28 of a spring clip interfit against opposed shoulders 34 on one side of a sprag 16 and the intermediate fingers 30 and 32 interfit against opposed similar shoulders 34 on the other side of an adjacent sprag. In the present instance, the opposed shoulders at each side of a sprag 16 are formed integral therewith and have axially extending recesses 36 therein which are adapted to receive the ends of the fingers 26, 28, 30 and 32 as shown. The fingers are preferably tensioned to resiliently grip the shoulder 34 therebetween. The biasing spring fingers 26 and 32 and 28 and 30 are resiliently yieldable generally radially of the clutch. However, the adjacent fingers 26 and 30 and the fingers 28 and 32 are substantially rigid circumferentially of the clutch so that the adjacent sprags are held in a substantially predetermined spaced relation. Also, if desired, lateral spacing members may project from opposite sides of each body portion 24 for sprag engagement to aid circumferential control of the sprags. Thus when the spring clips 22 and sprags 16 are secured together, the clutch 10 will be securely fastened together to form an annular unit handling assembly.

In order to bias the cam surfaces 18 against the races at all times, the fingers 26, 28, 30 and 32 are tensioned so as to urge the surfaces 18 against the races 12 and 14. Thus the fingers 26 and 32 will tend to draw the cam surface 18' of the sprag 16' towards the cam surface 18" of sprag 16" and the fingers 28 and 30 will serve in the capacity of spacing members between adjacent sprags whereupon the cam surfaces 18'" and 18"" will also enter into clutching engagement with the races. It will thus be seen that when the clutch 10 is disposed between concentric races 12 and 14, the cam surfaces 18 on the ends of the sprags 16 will be biased against the inner and outer races 12 and 14 at all times. When installing this assembly between the races 12 and 14, the sprags 16 are all tilted slightly from initial radial positions to permit their insertion between the races. This tilting deforms the spring fingers so that these fingers thereafter resiliently urge the sprags towards race-engaging positions.

When the outer race 14 is rotating clockwise relative to the inner race 12, the cam surfaces 18 on the opposite ends of the sprags 16 will tend to slide on the inner and outer races 12 and 14. However, when the outer race 14 reverses its direction and rotates counterclockwise relative to the inner race 12, the friction of the cam surfaces 18 on the races 12 and 14 and also the resilient biasing of the spring clips 22 will cause the sprags 16 to rock counterclockwise. The sprags 16 will then wedge between the races 12 and 14 and transmit torque from one race to the other. When one of the sprags 16 rocks into or out of wedging engagement with the races 12 and 14, it may be seen that the spring clips 22 will act as resilient links between adjacent sprags and cause the outer ends of the sprags to simultaneously move in one direction and the inner ends to simultaneously move in the opposite direction. Thus all of the sprags will simultaneously rotate into or out of wedging engagement with the races 12 and 14. This insures each of the sprags absorbing its full share of the load.

In addition it should be noted that the resilience of the spring clip will permit a very limited amount of relative tilting between the sprags. This in turn will permit small angular movements between the sprags and thus accommodate for any differences in the angular positioning of the sprags resulting from variations in the size and shape of the sprags.

It is to be understood that, although the invention has been described with specific reference to a particular embodiment thereof, it is not to be so limited since changes and alterations therein may be made which are within the full intended scope of this invention as defined by the appended claims.

I claim:

1. A one way clutch adapted to be disposed between a pair of coaxial cylindrical races, said clutch comprising a plurality of circumferentially spaced sprags, each of said sprags having a rigid body portion with cam surfaces on the ends thereof for engaging said races and shoulder means on said sprags between said cam surfaces, and a plurality of individual spring clips disposed between adjacent sprags, each spring clip engaging shoulders on adjacent sprags for biasing said cam surfaces against said races.

2. A one way clutch adapted to be disposed between a pair of substantially concentric cylindrical races which are relatively rotatable to each other, said clutch comprising a plurality of circumferentially spaced sprags and a plurality of spring clips, each of said sprags having intermediate shoulders and cam surfaces on the opposite ends thereof for engaging said races, each of said spring clips being disposed between adjacent pairs of sprags and being demountably secured to said shoulders on adjacent sprags for biasing said cam surfaces against said races.

3. A one way clutch adapted to be disposed between a pair of coaxial cylindrical races rotatable relative to each other, said clutch comprising a plurality of circumferentially spaced sprags and a plurality of spring clips, each of said sprags having a pair of intermediate shoulders at one side of the sprag and having cam surfaces on the opposite ends thereof for engaging said races, each of said spring clips being disposed between adjacent pairs of sprags and having a body portion with resilient fingers projecting therefrom and engaging the shoulders on adjacent sprags to bias said cam surfaces against said races.

4. A one way clutch adapted to be disposed between a pair of substantially concentric cylindrical races rotatable relative to each other, said clutch comprising a plurality of circumferentially spaced sprags and a plurality of spring clips, each of said sprags having intermediate shoulders and having cam surfaces on the opposite ends thereof for engaging said races, each of said spring clips being disposed between adjacent pairs of said sprags and having a body portion with resilient fingers extending from the opposite ends thereof, said fingers demountably interfitting with the shoulders on adjacent sprags and biasing said sprags for resiliently retaining said cam surfaces against said races.

5. A one way clutch adapted to be disposed between a pair of coaxial cylindrical races rotatable relative to each other, said clutch comprising a plurality of circumferentially spaced sprags and a plurality of spring clips, each spring clip being disposed between an adjacent pair of sprags, each of said sprags having cam surfaces on the opposite ends thereof for engaging said races, opposed shoulders on each sprag, each of said spring clips having a body portion disposed substantially radially of said races and resilient fingers projecting substantially in opposite directions from the opposite ends of said body portion to engage said shoulders and bias said cam surfaces against said races.

6. A sprag adapted to be one of a series of sprags for use in a one way clutch disposed between a pair of relatively rotatable races, said sprag comprising a rigid body portion adapted to be radially disposed between said races, arcuate cam surfaces on the opposite ends of said body portion for wedging engagement with said races, and shoulder means laterally projecting circumferentially from the opposite sides of each of said sprags between said cam surfaces said shoulder means being respectively provided with recesses extending inwardly therefrom and longitudinally of a sprag for demountably receiving in interlocking relation therewith the hooked ends of spring members for biasing said cam surfaces against said races.

7. A sprag adapted to be one of a series of sprags for use in a one way clutch disposed between a pair of relatively rotatable races, said sprag comprising a rigid body portion, cam surfaces on the opposite ends of said body portion for wedging engagement with said races, and a pair of shoulders laterally projecting from the opposite sides of each of said sprags between said cam surfaces, said shoulders being adapted to receive spring means for securing said sprags together and biasing said cam surfaces against said races.

8. Spring means adapted to be one of a group of similar spring means for resiliently biasing a plurality of sprags in a one way clutch, said spring means comprising a body portion and resilient fingers, said fingers on each spring means projecting from the opposite ends of said body portion for interlocking engagement with adjacent sprags.

9. A spring adapted to be one of a group of similar springs for resiliently biasing the opposite ends of a plurality of circumferentially spaced sprags against a pair of coaxial races, said spring comprising a body portion adapted to be disposed substantially radially of the races between adjacent pairs of sprags, and resilient fingers projecting circumferentially of said races from the opposite ends of said body portion, said fingers being adapted to engage adjacent sprags and bias said opposite ends of the sprags against said races.

10. A spring member adapted to be one of a group of similar circumferentially spaced members for resiliently biasing the opposite ends of a plurality of annularly disposed circumferentially spaced sprags against a pair of coaxial races said spring member comprising a rigid body portion adapted to be positioned generally radially of the annular arrangement of sprags and having laterally projecting fingers extending in opposite directions from the body portions and arranged to detachably interlock with adjacent sprags, said fingers being resiliently yieldable generally radially of the annular arrangement of sprags, and said fingers being substantially rigid in a circumferential direction of said annularly disposed sprags for holding said sprags in predetermined peripheral spaced relation.

11. A one way clutch adapted to be disposed between a pair of coaxial cylindrical races said clutch including a plurality of circumferentially spaced sprags, each sprag having cam faces at its opposed ends for engaging said races in a driving connection, shoulder means intermediate the cam surfaces on each sprag and laterally projecting therefrom, and a plurality of individual spring clips disposed between adjacent sprags and yieldably interlocked therewith, said spring clips being demountedly secured to said shoulders for biasing the cam surfaces against the races and holding the clips and sprags in a unit-handling annular assembly.

12. A one way clutch for use with cylindrical coaxial races comprising a series of tiltable grippers formed with their opposite ends curved to wedge between the races when they are tilted in one direction and to disengage the races when they are tilted in the opposite direction, and a series of links, each link pivotally connected at its ends to adjacent grippers to cause the grippers to tilt simultaneously and to limit relative tilting of the grippers.

References Cited in the file of this patent

UNITED STATES PATENTS

| | | |
|---|---|---|
| 2,570,290 | Turner | Oct. 9, 1951 |
| 2,631,706 | Dodge | Mar. 17, 1953 |
| 2,750,019 | Ferris | June 12, 1956 |

FOREIGN PATENTS

| | | |
|---|---|---|
| 272,880 | Italy | Mar. 24, 1930 |
| 456,026 | Canada | Apr. 19, 1949 |